(12) United States Patent
Maguire et al.

(10) Patent No.: US 6,354,679 B1
(45) Date of Patent: Mar. 12, 2002

(54) OFF-SET SYMMETRICAL LINK AND AN ASSOCIATED SUBASSEMBLY FOR A TRACK CHAIN ASSEMBLY

(75) Inventors: Roy L. Maguire, Edelstein; Darby R. Robertson, Morton, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/553,543

(22) Filed: Apr. 20, 2000

(51) Int. Cl.⁷ ................................................ B62D 55/20
(52) U.S. Cl. ........................................ 305/201; 305/198
(58) Field of Search .................................. 305/185, 190, 305/193, 194, 195, 196, 198, 200, 201

(56) References Cited

U.S. PATENT DOCUMENTS

| 1,290,586 A |   | 1/1919  | Lambert      |
|-------------|---|---------|--------------|
| 1,469,001 A |   | 9/1923  | Gentry       |
| 2,566,678 A | * | 9/1951  | Reigel et al.|
| 3,937,530 A |   | 2/1976  | Sturges      |
| 4,423,910 A | * | 1/1984  | Narang       |
| 5,183,318 A | * | 2/1993  | Taft et al.  |
| 5,482,364 A |   | 1/1996  | Edwards et al.|
| 5,704,697 A | * | 1/1998  | Ketting et al.|
| 5,829,849 A | * | 11/1998 | Lawson       |
| 5,887,958 A | * | 3/1999  | Bissi et al. |
| 6,142,588 A | * | 11/2000 | Ketting et al.|

FOREIGN PATENT DOCUMENTS

| FR | 1362146 | 12/1964 |
| GB | 263352  | 12/1926 |

* cited by examiner

Primary Examiner—Russell D. Stormer
(74) Attorney, Agent, or Firm—Bradford G. Addison; Calvin E. Glastetter

(57) ABSTRACT

A link includes a body member having (i) a first side, (ii) a second side, (iii) a first aperture defined therethrough, and (iv) a second aperture defined therethrough. The body member has a rail surface and a shoe surface. A central axis passes through the rail surface and the shoe surface so as to define a substantially 90° angle between (i) the rail surface and the central axis and (ii) the shoe surface and the central axis. The body member is symmetrical about the central axis. The first aperture is off-set from the second aperture so that the first aperture is not coplanar with the second aperture.

18 Claims, 13 Drawing Sheets

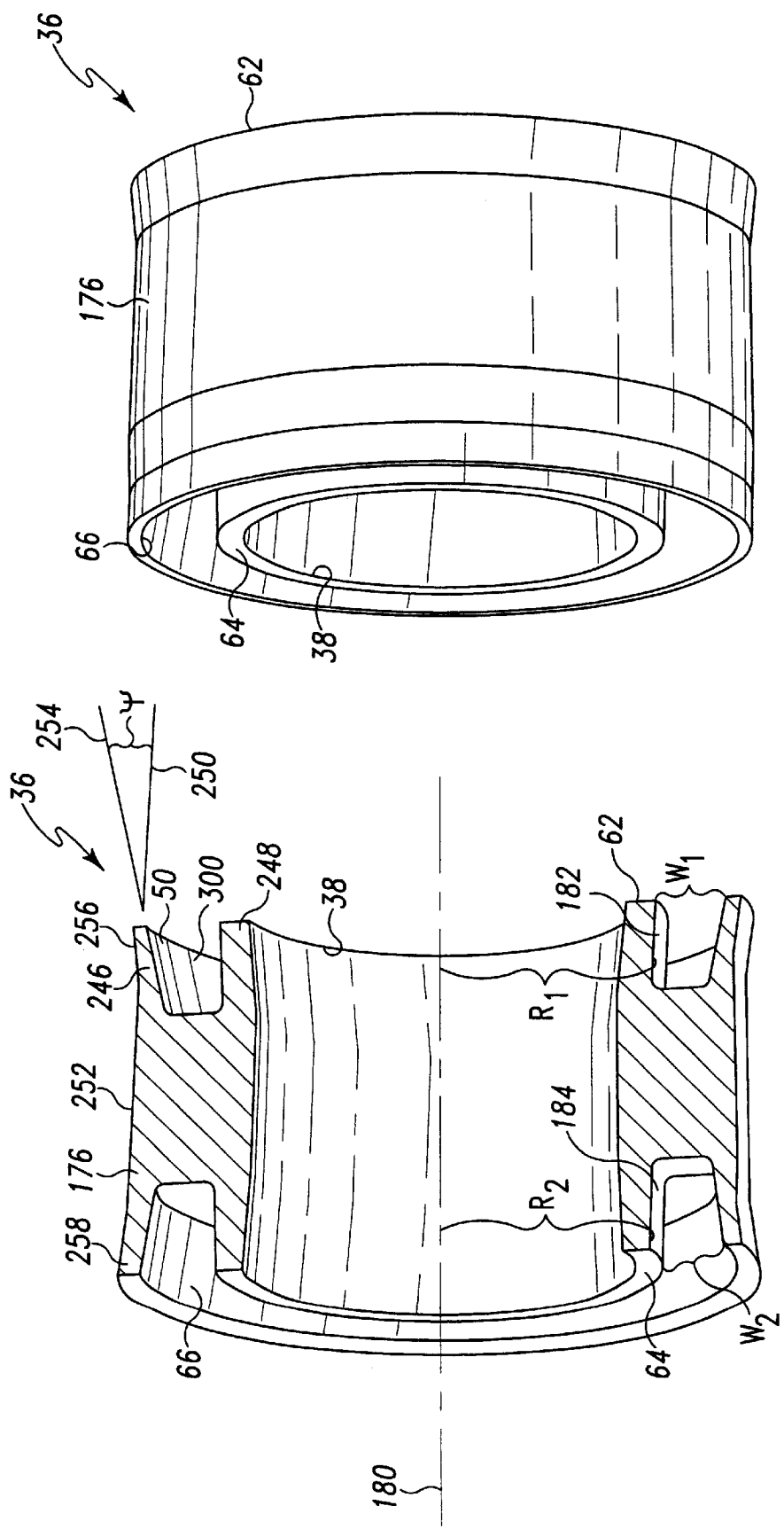

OFF-SET SYMMETRICAL LINK AND AN ASSOCIATED SUBASSEMBLY FOR A TRACK CHAIN ASSEMBLY

TECHNICAL FIELD

The present invention relates generally to track chain assemblies for a track type work machine, and more particularly to an off-set symmetrical link and associated subassembly of a track chain assembly.

BACKGROUND ART

Track type work machines typically have a sprocket, an idler, and a track chain assembly. During use of the work machine the sprocket rotates and engages the track chain assembly, thereby causing the track chain assembly to rotate around a path defined by the sprocket and the idler. The rotation of the track chain assembly causes the work machine to be propelled over the ground so as to perform various work functions.

Track chain assemblies generally include a pair of parallel chains, with each parallel chain being made up of a series of entrained track links. Track chain assemblies further include a series of bushings and track pins interposed between and connected to the parallel chains. The bushings and the entrained track links cooperate to form a number of track joints which allow the necessary movement of the bushings relative to the track links during use of the track chain assembly, for example, when the track chain assembly rotates about the sprocket and the idler.

Heretofore, many links utilized in track chain assemblies are asymmetrical. This asymmetry can increase the complexity of the manufacturing process. In addition, many types of links can only be utilized with track chain assemblies having either an odd number of track sections or an even number of track sections. Having links which can only be used with track chain assemblies having an even or an odd number of section also complicates the manufacturing and service of track chain assemblies.

What is needed therefore is a link for a track chain assembly which overcomes one or more of the above-mentioned drawbacks.

DISCLOSURE OF THE INVENTION

In accordance with one embodiment of the present invention, there is provided a link for a track chain assembly of a track type work machine. The link includes a body member having (i) a first side, (ii) a second side, (iii) a first aperture defined therethrough, and (iv) a second aperture defined therethrough. The link also includes a first extension member extending outwardly from the first side of the body member. The link further includes a second extension member extending outwardly from the first side of the body member. The second extension member is spaced apart from the first extension member. The link further includes a third extension member extending outwardly from the second side of the body member. The link also includes a fourth extension member extending outwardly from the second side of the body member. The fourth extension member is spaced apart from the third extension member. The body member has a rail surface and a shoe surface. A central axis passes through rail surface and the shoe surface so as to define a substantially 90° angle between (i) the rail surface and the central axis and (ii) the shoe surface and the central axis. The body member is symmetrical about the central axis.

In accordance with another embodiment of the present invention, there is provided a subassembly for a track chain of a track type work machine. The subassembly includes a first bushing having a first passageway defined therethrough. The subassembly also includes a first track pin positioned within the first passageway. The subassembly also includes a first insert having a first bore defined therein. The first insert is positioned relative to the first track pin such that the first track pin is located within the first bore. The subassembly also includes a second bushing having a second passageway defined therethrough. The subassembly further includes a second track pin positioned within the second passageway. The subassembly also includes a second insert having a second bore defined therein. The second insert is positioned relative to the second track pin such that the second track pin is located within the third bore. The subassembly also includes a first collar having a first hole defined therein. The first collar is positioned relative to the first track pin such that (i) the first track pin is located within the first hole so that the first track pin is unable to rotate relative to the first collar and (ii) the first insert is interposed between the first collar and the first bushing. The subassembly also includes a second collar having a second hole defined therein. The second collar is positioned relative to the second track pin such that (i) the second track pin is located within the second hole so that the second track pin is unable to rotate relative to the second collar and (ii) the second insert is interposed between the second collar and the second bushing. The subassembly further includes a link having (a) a body member which has (i) a first side, (ii) a second side, (iii) a first aperture defined therethrough, and (iv) a second aperture defined therethrough, (b) a first extension member extending outwardly from the first side of the body member, (c) a second extension member extending outwardly from the first side of the body member, the second extension member being spaced apart from the first extension member, (d) a third extension member extending outwardly from the second side of the body member, and (e) a fourth extension member extending outwardly from the second side of the body member, the fourth extension member being spaced apart from the third extension member. The body member has a rail surface and a shoe surface. A central axis passes through rail surface and the shoe surface so as to define a substantially 90° angle between (i) the rail surface and the central axis and (ii) the shoe surface and the central axis. The body member is symmetrical about the central axis. The link is positioned relative to the first insert and the second collar such that (i) the first insert is located within the first aperture and (ii) the second collar is located within the second aperture.

In accordance with still another embodiment of the present invention, there is provided a link for a track chain assembly of a track type work machine. The link includes a body member having (i) a first side, (ii) a second side, (iii) a first aperture defined therethrough, and (iv) a second aperture defined therethrough. The link also includes a first extension member extending outwardly from the first side of the body member. The link also includes a second extension member extending outwardly from the first side of the body member. The second extension member is spaced apart from the first extension member. The link also includes a third extension member extending outwardly from the second side of the body member. The link further includes a fourth extension member extending outwardly from the second side of the body member. The fourth extension member is spaced apart from the third extension member. The body member has a rail surface and a shoe surface. A central axis passes through the rail surface and the shoe surface so as to define a substantially 90° angle between (i) the rail surface and the central axis and (ii) the shoe surface and the central axis. The body member is symmetrical about the central axis. The first aperture is off-set from the second aperture so that the first aperture is not coplanar with the second aperture. The second extension member and the fourth extension member are interposed between the first aperture and the second aperture.

BRIEF DESCRIPTION OF THE DRAWINGS

FIG. 15 is a cross sectional view of an insert of the cartridge assembly shown in FIG. 4A;

FIG. 16 is a perspective view of the insert shown in FIG. 15; and

BEST MODE FOR CARRYING OUT THE INVENTION

Figure 1:
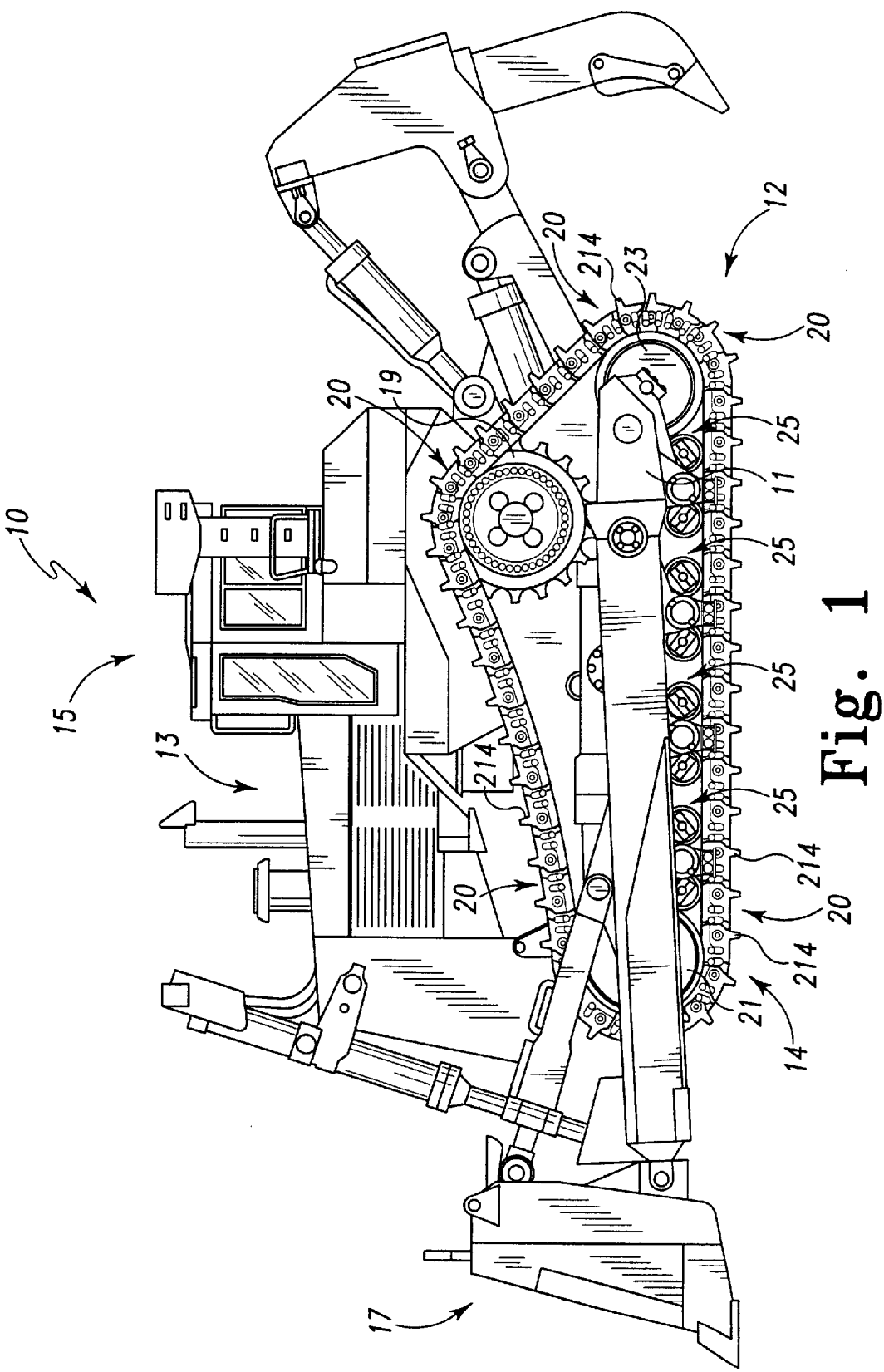
FIG. 1 is a side elevational view of a work machine which incorporates the features of the present invention therein.

Referring now to FIG. 1 there is shown a work machine 10 which incorporates the features of the present invention therein. Work machine 10 includes a frame 11, an engine assembly 13, and a cab assembly 15 all mounted on frame 11. Work machine 10 also includes a work implement 17, such as a blade, mechanically coupled to frame 11. Work machine 10 further includes an undercarriage assembly 12 mechanically coupled to frame 11.

Undercarriage assembly 12 includes a drive sprocket 19, a pair of idler wheels 21 and 23, and a number of roller assemblies 25 interposed between idler wheels 21 and 23. (Note that the present invention can also be utilized in oval systems.) Undercarriage assembly 12 also includes a track chain assembly 14. During use of work machine 10 drive sprocket 19 rotates and engages track chain assembly 14, thereby causing track chain assembly 14 to rotate around a path defined by drive sprocket 19 and idler wheels 21 and 23. The rotation of track chain assembly 14 causes work machine 10 to be propelled over the ground so as to perform various work functions.

Figure 2:
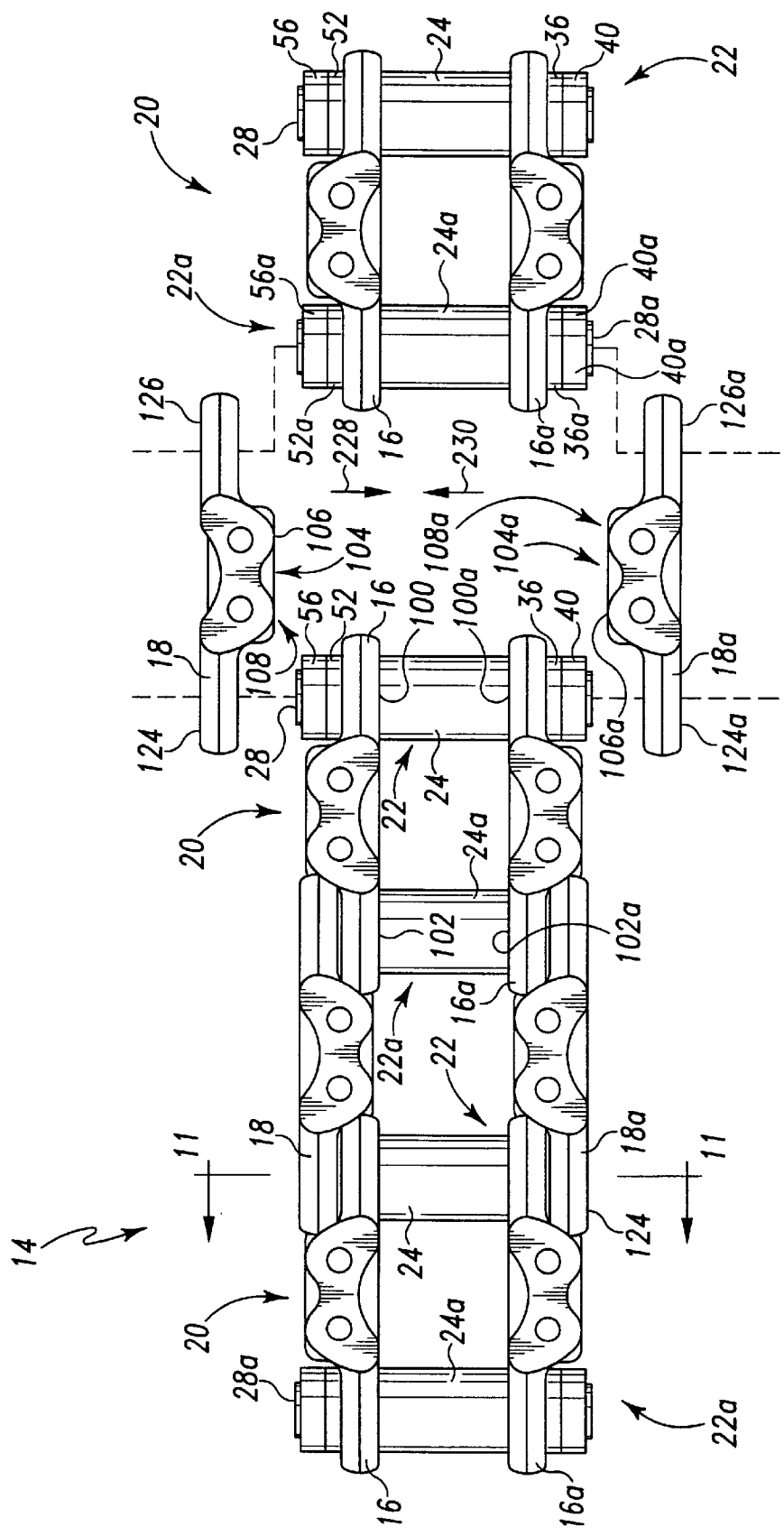
FIG. 2 is a top elevational view of a segment of a track chain assembly of the work machine of FIG. 1.
Figure 3:
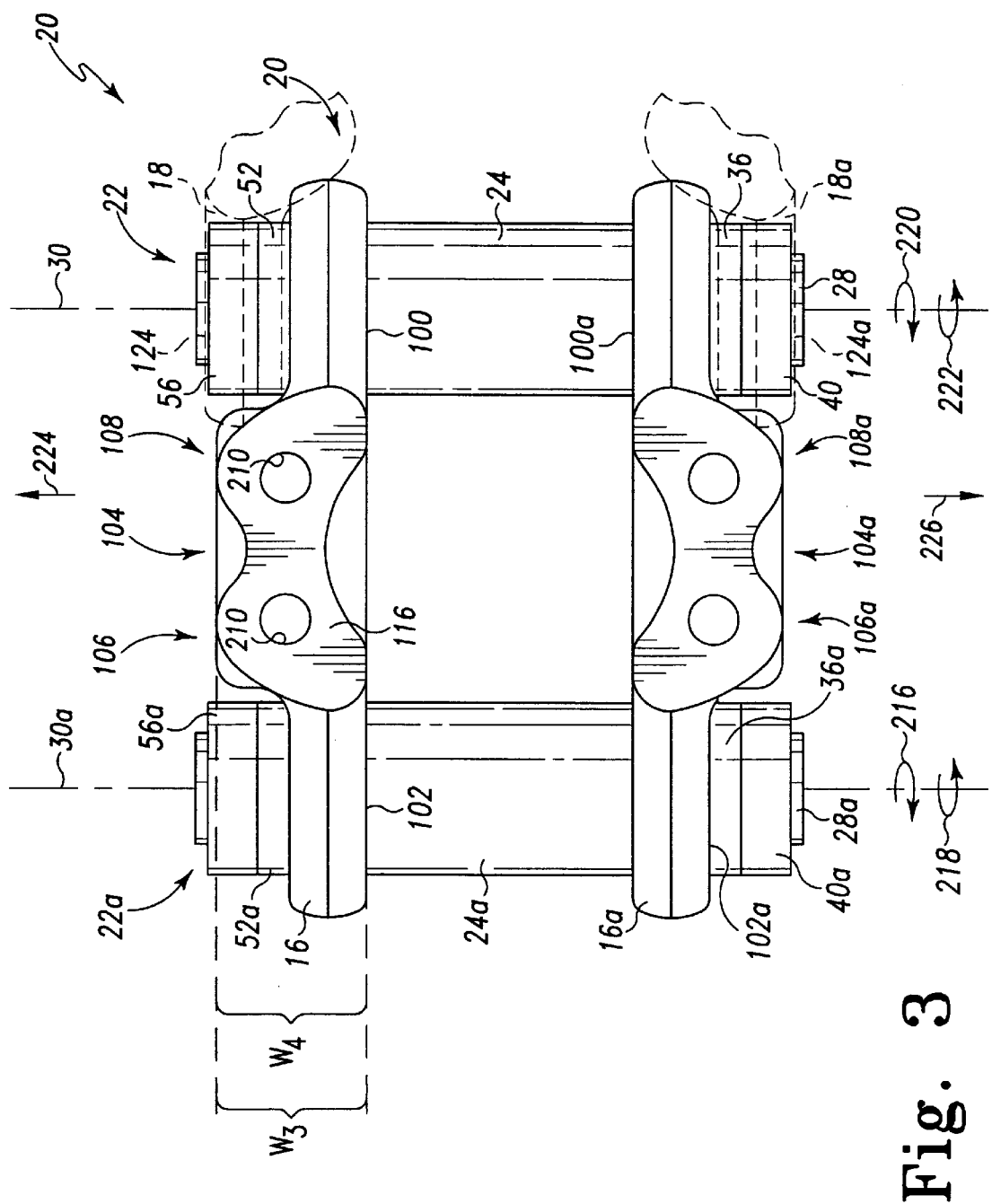
FIG. 3 is a top elevational view of a subassembly of the track chain assembly shown in FIG. 2.

As shown more clearly in FIGS. 2 and 3, track chain assembly 14 includes a number of subassemblies 20 with track shoes 214 (see FIG. 1) attached to each subassembly 20. As discussed in greater detail below, each subassembly 20 is mechanically coupled to an adjacent subassembly 20 by an outer link 18 and an outer link 18a so that track chain assembly 14 forms a closed loop. The closed loop of track chain assembly 14 is disposed around drive sprocket 19, idler wheels 21 and 23, and roller assemblies 25 so as to function in the above described manner.

Each subassembly 20 includes a cartridge assembly 22, a cartridge assembly 22a, an inner link 16, and an inner link 16a. Cartridge assembly 22a is substantially identical to cartridge assembly 22, therefore only cartridge assembly 22 will be described in detail herein.

Figure 4A:
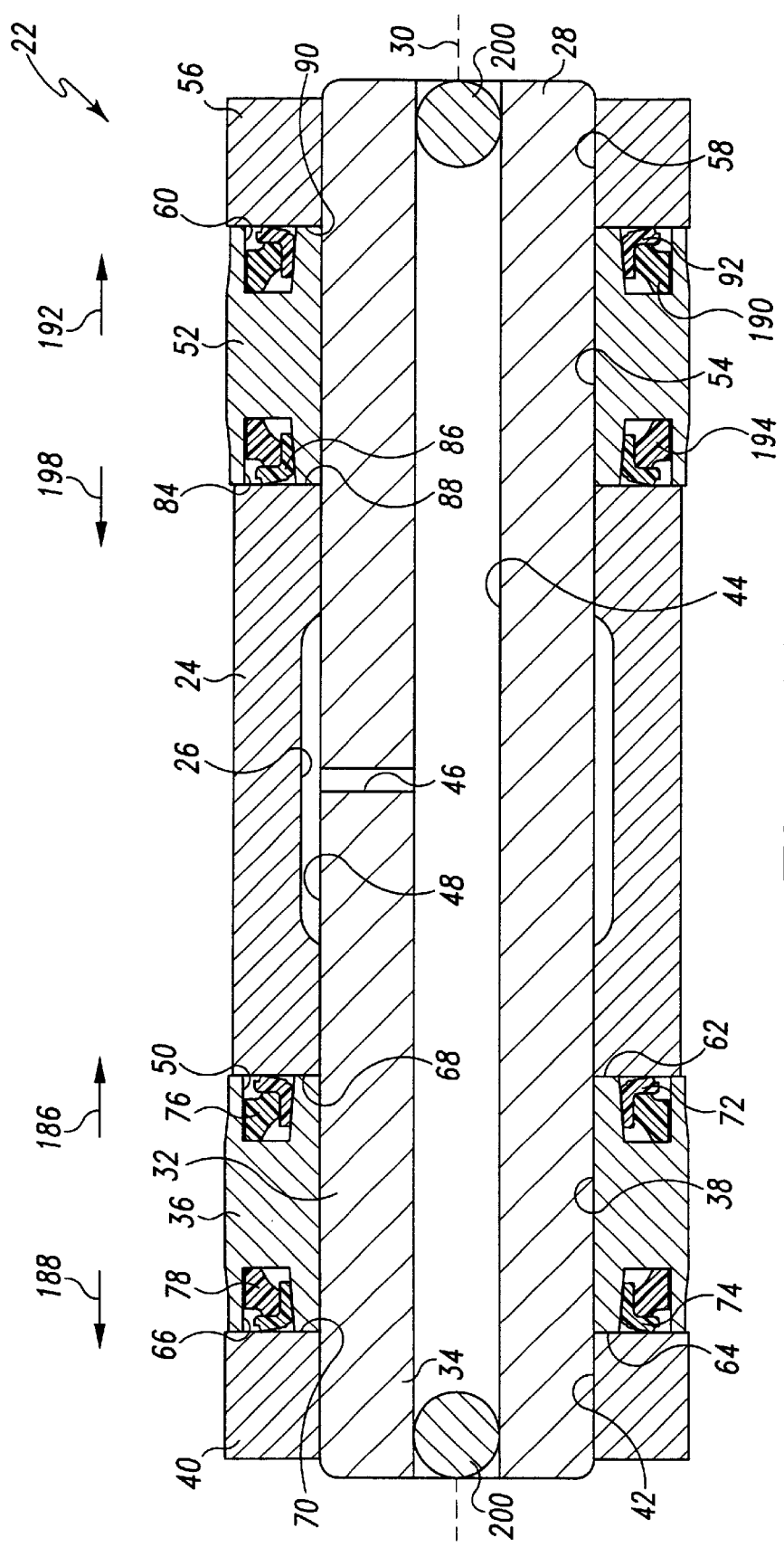
FIG. 4A is a longitudinal cross sectional view of a cartridge assembly of the track chain assembly shown in FIG. 2.
Figure 4B:
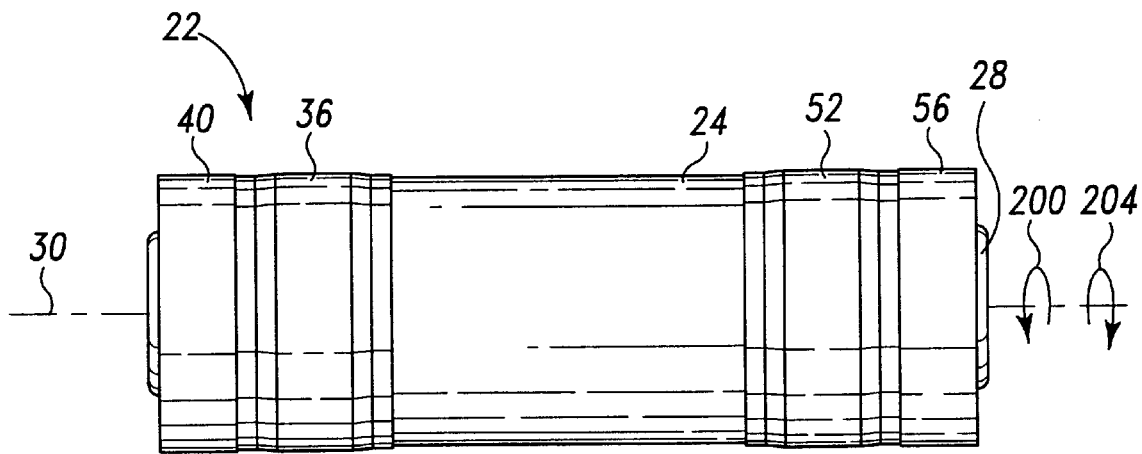
FIG. 4B is a side elevational view of the cartridge assembly shown in FIG. 4A.
Figure 4C:
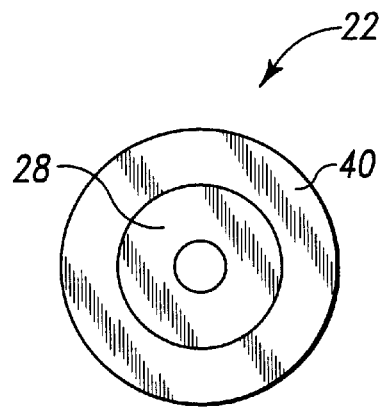
FIG. 4C is an end elevational view of the cartridge assembly shown in FIG. 4B.
Figure 5:
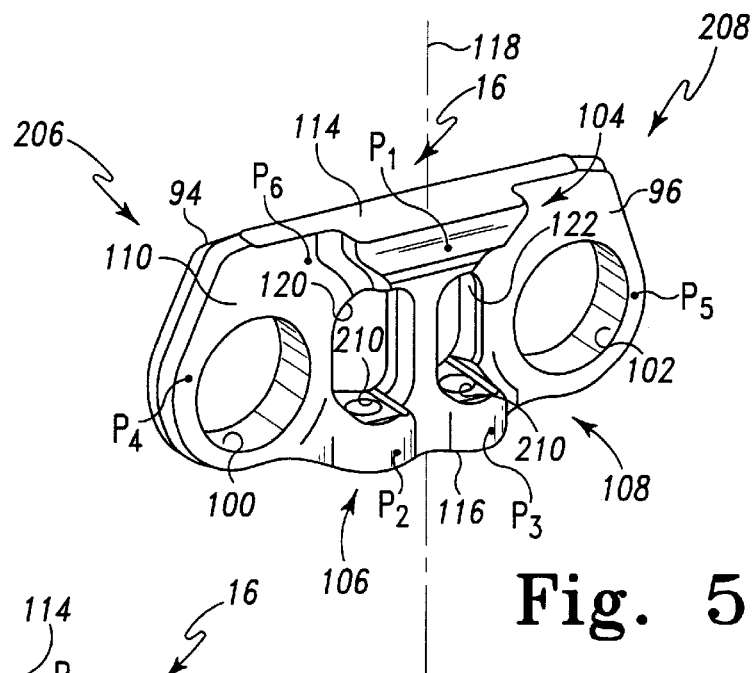
FIG. 5 is a perspective view of a link of the track chain assembly shown in FIG. 2.
Figure 6:
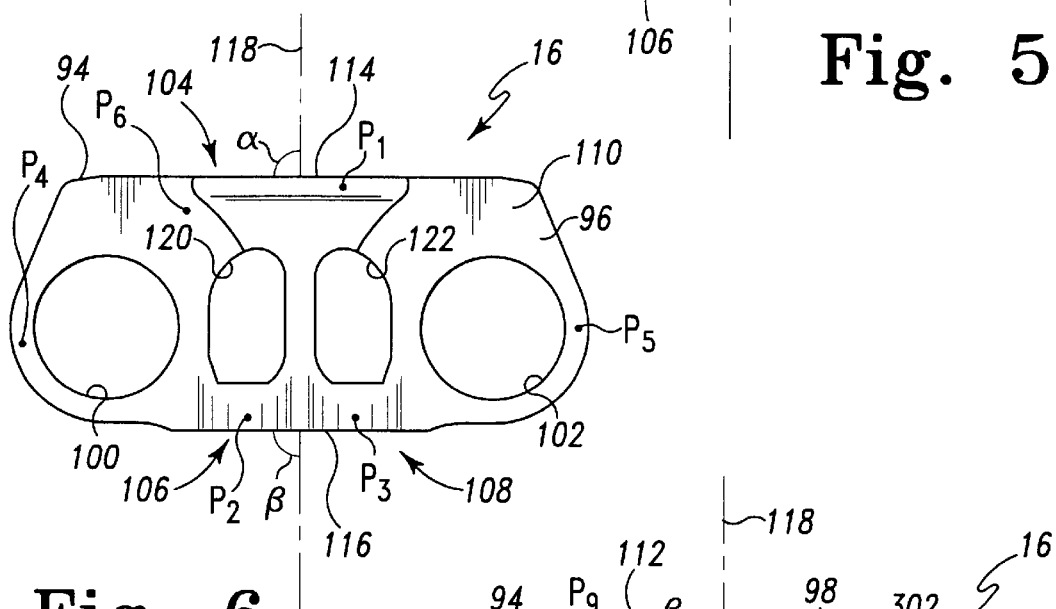
FIG. 6 is a side elevational view of the link shown in FIG. 5.
Figure 7:
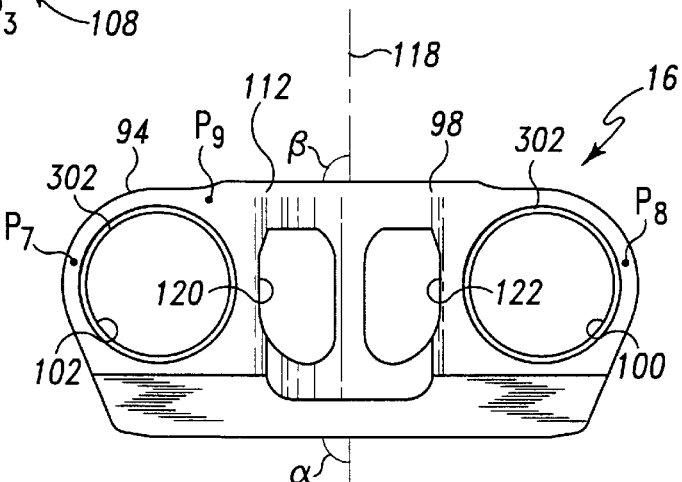
FIG. 7 is another side elevational view of the link shown in FIG. 5.
Figure 8:
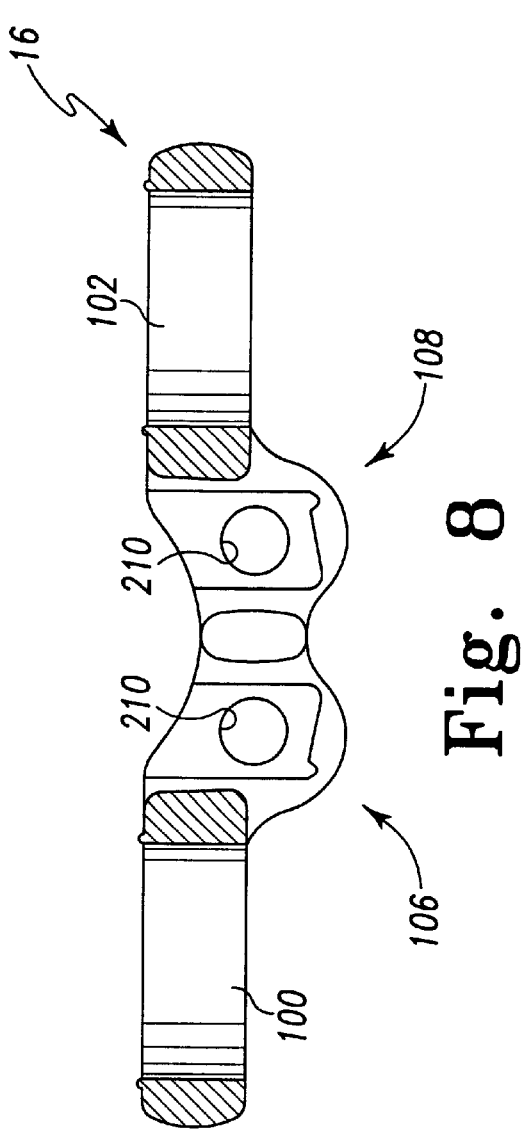
FIG. 8 is a cross sectional view of the link shown in FIG. 5.
Figure 9:
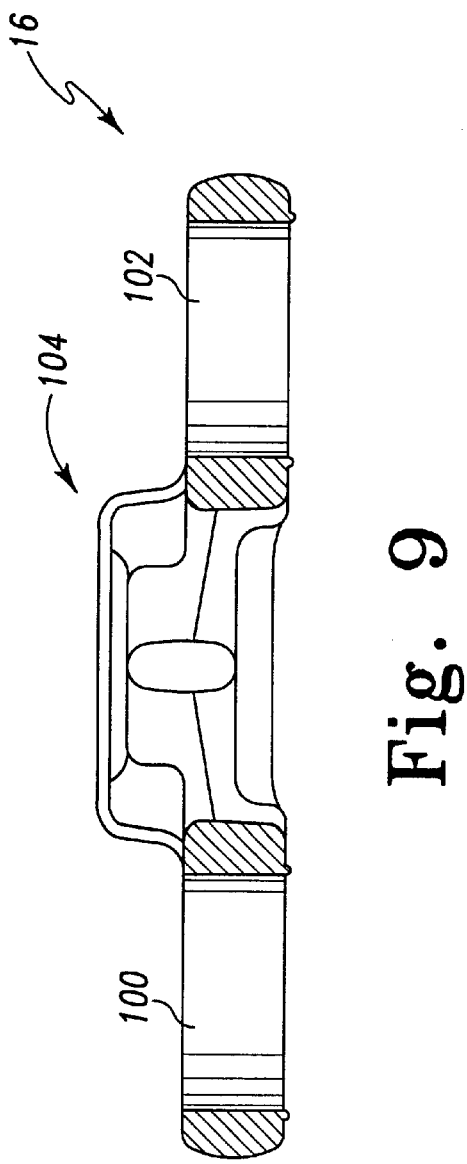
FIG. 9 is another cross sectional view of the link shown in FIG. 5.

As shown in FIGS. 4A, 4B, and 4C cartridge assembly 22 includes a bushing 24 having a passageway 26 defined therethrough, a track pin 28, an insert 36 having a bore 38 defined therethrough, and an insert 52 having a bore 54 defined therethrough. It should be appreciated that insert 52 is substantially identical to insert 36, therefore only insert 36 is described in detail herein. Cartridge assembly 22 also includes collar 40 having a hole 42 defined therein. Cartridge assembly 22 also includes another collar 56 which is substantially identical to collar 40. In particular, collar 56 also has a hole 58 defined therein.

Referring now to FIGS. 15 and 16, insert 36 includes a ring member 176 having a sidewall 62 and a sidewall 64. A seal groove 50 is defined in sidewall 62 such that seal groove 50 is concentric with a central axis 180 of bore 38. Defining seal groove 50 in sidewall 62 results in an upper wall segment 246 and a lower wall segment 248 being formed, with seal groove 50 positioned between upper wall segment 246 and a lower wall segment 248. Upper wall segment 246 has an inner surface 300 which is angled away from central axis 180 such that a linear extension 250 of a central outer surface 252 of ring member 176, which is in a substantially parallel relationship with central axis 180, and a linear extension 254 of inner surface 300 define an angle φ therebetween. Preferably, angle φ is about 5° (note that angle φ is shown somewhat exaggerated in FIG. 15 for clarity of description).

Sidewall 64 also has a seal groove 66 defined therein which is concentric with central axis 180 of bore 38. It should be appreciated that an upper wall segment 258 of ring member 176 is angled away from central axis 180 in a substantially identical manner as described above for upper wall segment 246.

Seal groove 50 has a width $W_1$ and a radius $R_1$. It should be understood that what is meant herein by radius $R_1$ is the distance between central axis 180 and an inner wall segment 182 of seal groove 50 as shown in FIG. 15. Seal groove 66 also has a width $W_2$ and a radius $R_2$. In a similar manner as that described above, what is meant herein by radius $R_2$ is the distance between central axis 180 and an inner wall segment 184 of seal groove 66 as shown in FIG. 15. Preferably, width $W_1$ is substantially equal to width $W_2$. It is also preferable that radius $R_1$ is substantially equal to radius $R_2$.

Referring back to FIG. 4A, seal groove 50 has (i) an annular thrust member 76 and (ii) an annular seal member 72 disposed therein. Thrust member 76 and seal member 72 are positioned in seal groove 50 so that thrust member 76 urges seal member 72 in an axial direction as indicated by arrow 186. It should be understood that having upper wall segment 246 angled away from central axis 180 in the above described manner facilitates the insertion of annular thrust member 76 and annular seal member 72 into seal groove 50 as compared to other seal groove designs that have a straight or non-angled upper wall segment. In particular, the angling of upper wall segment 246 enhances the ability of machinery being utilized to insert annular thrust member 76 and annular seal member 72 into seal groove 50. In a similar manner, seal groove 66 has (i) an annular thrust member 78 and (ii) an annular seal member 74 disposed therein. Thrust member 78 and seal member 74 are positioned in seal groove 66 so that thrust member 78 urges seal member 74 in an axial direction as indicated by arrow 188. As indicated above, having upper wall segment 258 of ring member 176 angled away from central axis 180 also enhances the ability of machinery being utilized to insert annular thrust member 78 and annular seal member 74 into seal groove 66.

In a similar manner, an annular seal groove 60 of insert 52 has (i) an annular seal member 92 and (ii) an annular thrust member 190 disposed therein. Thrust member 190 and seal member 92 are positioned in seal groove 60 so that thrust member 190 urges seal member 92 in an axial direction as indicated by arrow 192. An annular seal groove 84 of insert 52 also has (i) an annular thrust member 194 and (ii) an annular seal member 86 disposed therein. Thrust member 194 and seal member 86 are positioned in seal groove 84 so that thrust member 194 urges seal member 86 in an axial direction as indicated by arrow 198.

Although having both seal grooves defined in the insert is preferred, it is also contemplated that a seal groove be defined in a collar sidewall. A seal member and a thrust member is then disposed in the seal groove defined in the collar sidewall. In this embodiment one sidewall of the insert serves as a bearing surface for the seal member disposed in the seal groove of the collar. It is also contemplate that the thrust member can be integral with the collar. In addition, it is contemplated that the thrust member can be integral with the insert.

Referring now to FIGS. 4A, 4B, and 4C, track pin 28 is inserted into passageway 26 of bushing 24 such that bushing 24 can rotate relative to track pin 28 in the directions indicated by arrows 200 and 204 (see FIG. 4B). Insert 36 is positioned relative to track pin 28 and bushing 24 such that (i) a portion 32 of track pin 28 extends through bore 38 and (ii) seal groove 50 is in an opposing relationship with an end face 68 of bushing 24. Insert 36 is further positioned relative to bushing 24 so that seal member 72 is urged against end face 68 of bushing 24 by thrust member 76. It should be appreciated that insert 36 can rotate around longitudinal axis 30 relative to both bushing 24 and track pin 28 in the directions indicated by arrows 200 and 204 (see FIG. 4B).

Collar 40 is positioned relative to track pin 28 and insert 36 so that (i) a portion 34 of track pin 28 extends into hole 42 and (ii) an end face 70 of collar 40 is in an opposing relationship with seal groove 66. Collar 40 is further positioned relative to insert 36 so that seal member 74 is urged against end face 70 of collar 40 by thrust member 78. Collar 40 is fixed in relation to track pin 28 so that collar 40 can not (i) rotate relative to track pin 28 or (ii) move in an axial direction relative to track pin 28. For example, collar 40 can be laser welded to track pin 28. Attaching collar 40 to track pin 28 in the above described manner enhances control over the end play of track chain 14.

Insert 52 and collar 56 are positioned relative to track pin 28 and bushing 24 in a similar manner as described above for insert 36 and collar 40. In particular, insert 52 is positioned relative to track pin 28 and bushing 24 such that (i) a portion of track pin 28 extends through bore 54 and (ii) seal groove 84 is in an opposing relationship with an end face 88 of bushing 24. Insert 52 is further positioned relative to bushing 24 so that seal member 86 is urged against end face 88 of bushing 24 by thrust member 194. It should be appreciated that insert 52 can rotate relative to both bushing 24 and track pin 28 in the directions indicated by arrows 200 and 204 (see FIG. 4B).

Collar 56 is positioned relative to track pin 28 and insert 52 so that (i) a portion of track pin 28 extends into hole 58 and (ii) an end face 90 of collar 56 is in an opposing relationship with seal groove 60. Collar 56 is further positioned relative to insert 52 so that seal member 92 is urged against end face 90 of collar 56 by thrust member 190. Collar 56 is fixed in relation to track pin 28 so that collar 56 can not rotate relative to track pin 28 or move in an axial direction relative thereto. For example, collar 56 can be laser welded to track pin 28. Attaching collar 56 to track pin 28 in the above described manner also enhances control over the end play of track chain 14.

As shown in FIG. 4A, track pin 28 has a lubrication reservoir 44 defined therein. Lubrication reservoir 44 is in fluid communication with a lubrication channel 46. Lubrication channel 46 leads to an outer surface 48 of track pin 28. A pair of plugs 200 are located within lubrication reservoir 44 to prevent a lubricant, such as oil, from leaking out of lubrication reservoir 44. During use of cartridge assembly 22 oil disposed within lubrication reservoir 44 is advanced through lubrication channel 46 to outer surface 48 of track pin 28. Once disposed on outer surface 48, the oil facilitates the rotation of insert 36, bushing 24, and insert 52 relative to track pin 28. The oil also lubricates sealing members 72, 74, 86, and 92.

Sealing members 72, 74, 86, and 92, thrust members 76, 78, 109, and 194, collar end faces 70 and 90, and bushing end faces 68 and 88 all cooperate to keep the oil within cartridge assembly 22 while keeping debris (e.g. sand, rocks, etc) out.

Referring now to FIGS. 5–10, there is shown an inner link 16. It should be understood that inner link 16a, outer link 18, and outer link 18a are all substantially identical to inner link 16, and thus only inner link 16 will be described in detail herein.

Figure 11:
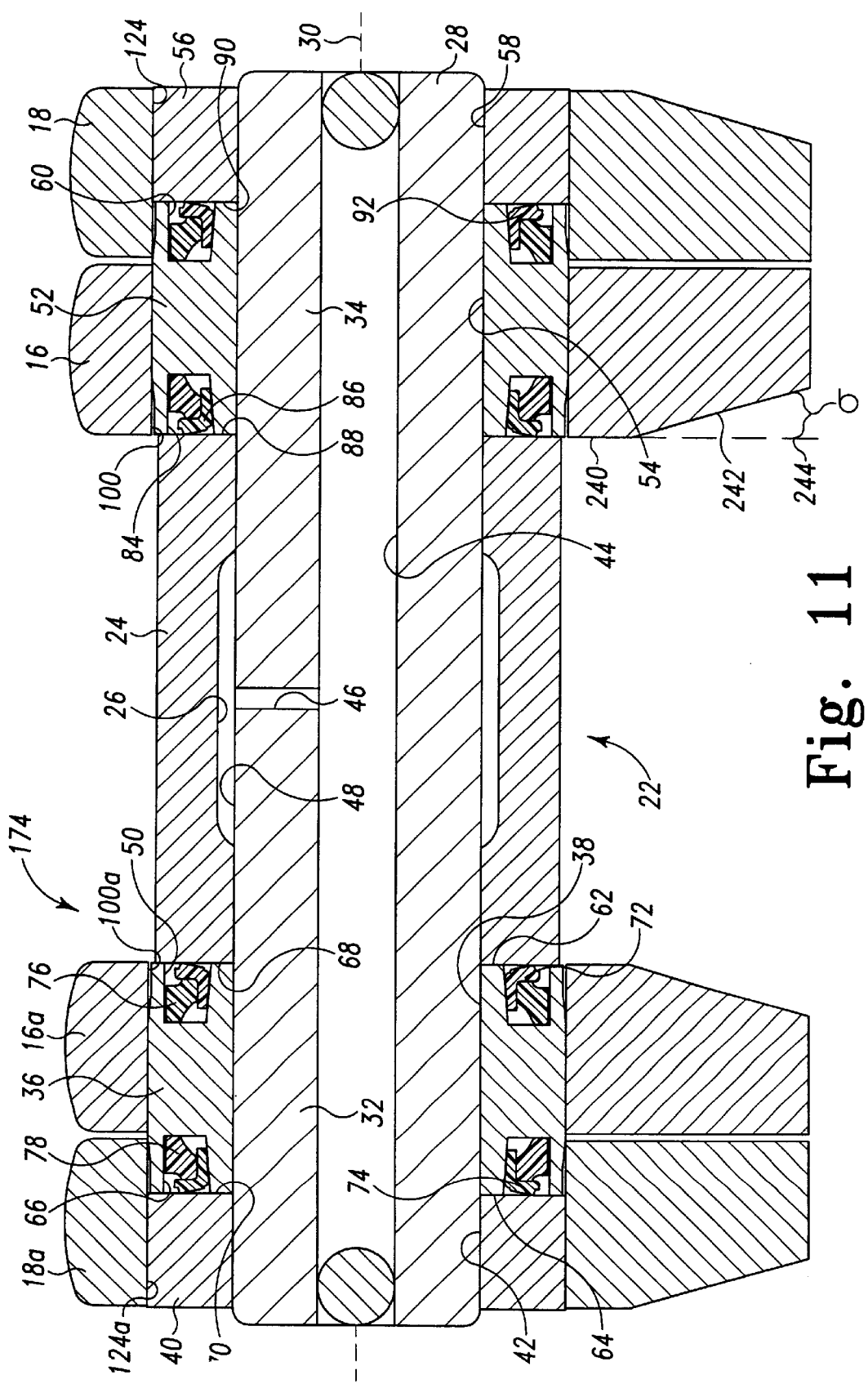
FIG. 11 is a cross sectional view of the track chain assembly shown in FIG. 2 taken along the line 11—11 as viewed in the direction of the arrows.

Inner link 16 includes a body member 94 having (i) a side 96, (ii) a side 98, (iii) an aperture 100 defined therethrough, (iv) an aperture 102 defined therethrough, (v) a rail surface 114, and (vi) a shoe surface 116. Body member 94 also has a pair of exit holes 120 and 122 defined therein. However, it should be appreciated that only one exit hole can be utilized in, for example, a strutless link design. Both exit holes 120 and 122 are preferably interposed between aperture 100 and aperture 102. A bolt hole 210 is positioned within each exit hole 120 and 122. It should be appreciated that each bolt hole 210 is aligned with rail surface 114 such that each bolt hole 210 is laterally centered with respect to the widest portion of rail surface 114. Bolt holes 210 are utilized to secure a track shoe 214 to shoe surface 116 of inner link 16. Moreover, as shown in FIG. 11, inner link 16 has a wall segment 240 and a wall segment 242. Wall segment 242 is angled relative to wall segment 240 such that a linear extension 244 of wall segment 240 and wall segment 242 define an angle σ of about 20°. Wall segment 242 functions as a surface for guiding contact with roller flanges (not shown) of track chain assembly 14. Having wall segment 242 of each link angled in the above described manner enhances the ability of the roller flanges to guide track chain assembly 14 during use thereof.

It should be appreciated that body member 94 has a central axis 118 passing therethrough so as to define a substantially 90° between (i) rail surface 114 and central axis 118 (i.e. angle α) and (ii) shoe surface 116 and central axis 118 (i.e. angle β) Furthermore, it should be understood that body member 94 is symmetrical about central axis 118. What is meant herein by symmetrical is the property of being the same or corresponding on both sides of a central dividing line, such as central axis 118. It should further be understood that each half of body member 94, as defined by central axis 118, is the mirror image of the corresponding half.

Inner link 16 also includes an extension member 104 extending outwardly from side 96 of body member 94. Extension member 104 has a point $P_1$ defined thereon. Inner link 16 also includes an extension member 106 extending outwardly from side 96 of body member 94. Extension member 106 has a point $P_2$ defined thereon. Inner link 16 further includes an extension member 108 extending outwardly from side 96 of body member 94. Extension member 108 has a point $P_3$ defined thereon.

Extension member 104, extension member 106, and extension member 108 are (i) spaced apart from each other and (ii) are preferably interposed between aperture 100 and aperture 102. In addition, the point $P_1$, defined on the extension member 104, the point $P_2$ defined on the extension member 106, and the point $P_3$ defined on the extension member 108 define a first plane. Moreover, side 96 of body member 94 has an outer surface 110. Outer surface 110 has a point $P_4$ defined thereon, a point $P_5$ defined thereon, and a point $P_6$ defined thereon. The point $P_4$, the point $P_5$, and the point $P_6$ define a second plane which is in a substantially parallel relationship with the first plane. It should be appreciated that, preferably, (i) aperture 100 and aperture 102 are interposed between the point $P_4$ and the point $P_5$ and (ii) the second plane is only traversed by extension member 104, extension member 106, and extension member 108.

Side 98 of body member 94 also has an outer surface 112. Outer surface 112 has a point $P_7$ defined thereon, a point $P_8$ defined thereon, and a point $P_9$ defined thereon. The point $P_7$, the point $P_8$, and the point $P_9$ define a third plane which is in a substantially parallel relationship with the first plane. Preferably, aperture 100 and aperture 102 are interposed between the point $P_7$ and the point $P_8$. A pair of machining bosses 302 are disposed on outer surface 112 so as to surround apertures 100 and 102. Furthermore, it is preferable that no portion of body member 94 extends outwardly from side 98 so as to traverse the third plane other machining bosses 302.

It should be appreciated that having a link 16 in which (i) apertures 100 and 102 are coplanar, (ii) each side 96 and 98 are relatively flat, and (iii) any extension members 104, 106, and 108 which extend outwardly from side 96 of link 16 define a plane which is parallel with outer surface 110 is an advantage of the present invention. For example, having a link with the aforementioned characteristics results in a link having planar parallel contact surfaces. Having planar parallel contact surfaces facilitates the ability of link 16 to be appropriately located during link manufacturing processes, track chain 14 assembly processes, and track chain 14 disassembly processes. In addition, having inner link 16a, outer link 18, and outer link 18a all substantially identical to inner link 16 eliminates the need to have structurally distinct "right hand links" and "left hand links" typically used in other track chain assembly designs. Therefore, only a single type of link (i.e. link 16; links 16a, 18, and 18a are substantially identical to link 16a) needs to be manufactured in order to construct track chain assembly 14, thereby simplifying and reducing the manufacturing cost of track chain assembly 14.

Furthermore, having body member 94 of link 16 symmetrical about central axis 118 results in an equal distribution of material at each end 206 and 208 (see FIGS. 5 and 10) of link 16. Having a symmetrical link 16 and an equal distribution of material at each end 206 and 208 is advantageous. For example, it simplifies (i) design and analysis techniques, (ii) forging methods and tooling, (iii) locating and machining methods and tooling, and (iv) heat treat equipment. Therefore, one aspect of the present invention provides a link 16 having relatively low development and production costs.

Figure 10:
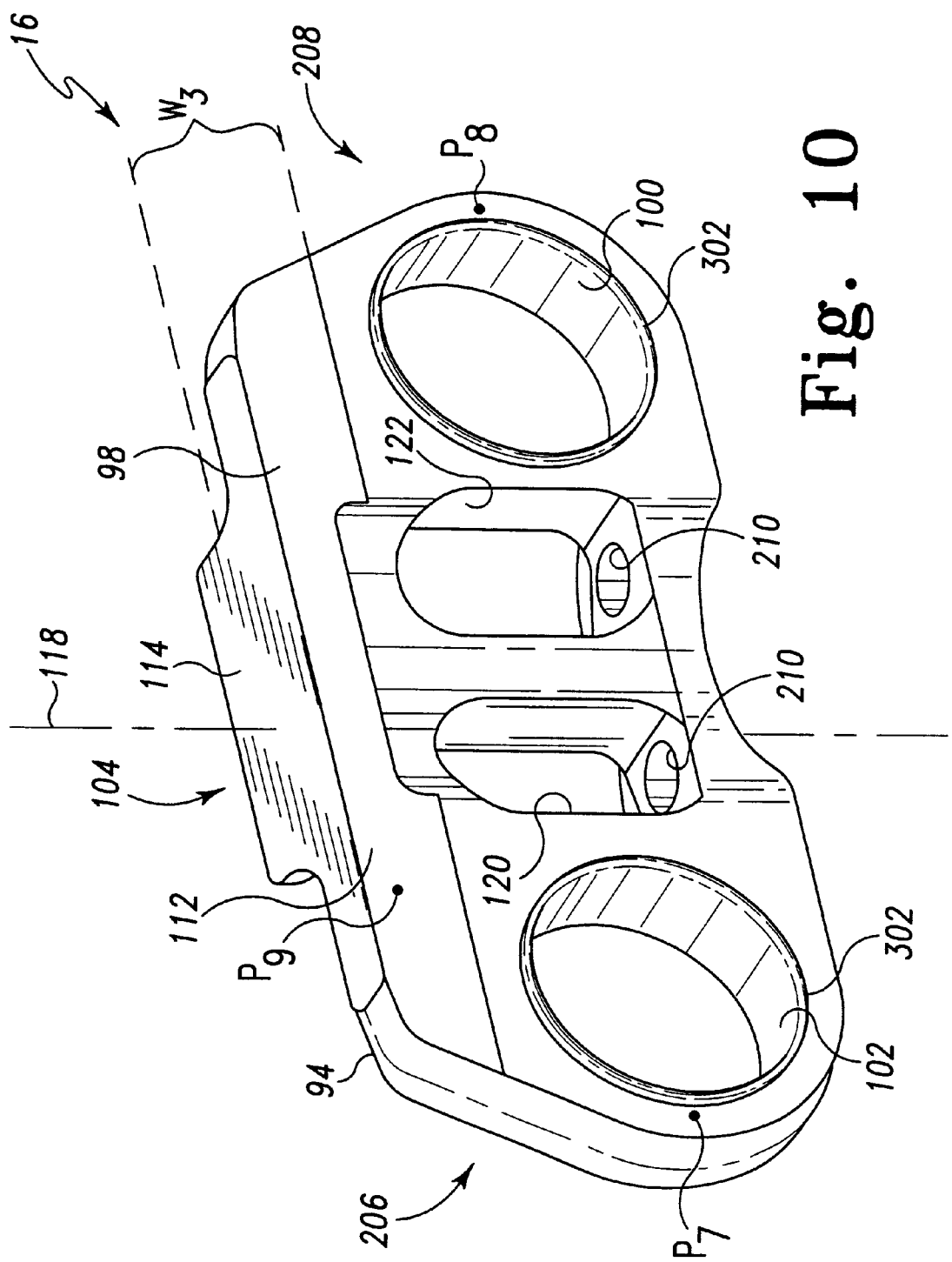
FIG. 10 is another perspective view of the link shown in FIG. 5.

Moreover, as shown in FIGS. 3 and 10, rail surface 114 has a width $W_3$, and shoe surface 116 has a width $W_4$ which is substantially equal to width $W_3$. Having width $W_3$ and width $W_4$ substantially equal also facilitates locating link 16 during manufacturing, assembly, and disassembly processes.

As previously mentioned, each subassembly 20 includes a cartridge assembly 22, a cartridge assembly 22a, an inner link 16, and an inner link 16a (see FIG. 3). Specifically, as shown in FIG. 3, inner link 16 is positioned relative to cartridge assembly 22 and cartridge 22a such that (i) insert 52 of cartridge assembly 22 is located within aperture 100 of inner link 16, (ii) insert 52a of cartridge assembly 22a is located within aperture 102 of inner link 16, and (iii) extension members 104, 106, and 108 are outwardly facing in the direction indicated by arrow 224. It should be appreciated that both inserts 52 and 52a are press fit into apertures 100 and 102. Having inserts 52 and 52a press fit into apertures 100 and 102, respectively, results in inserts 52 and 52a being unable to rotate relative to inner link 16. However, bushings 24 and 24a, track pins 28 and 28a, and collars 56 and 56a are able to rotate relative to inner link 16 in the directions indicated by arrows 216, 218, 220, and 222.

In a similar manner, inner link 16a is positioned relative to cartridge assembly 22 and cartridge 22a such that (i) insert 36 of cartridge assembly 22 is located within aperture 100a of inner link 16a, (ii) insert 36a of cartridge assembly 22a is located within aperture 102a of link 16a, and (iii) extension members 104a, 106a, and 108a are outwardly facing in the direction indicated by arrow 226. It should be appreciated that both inserts 36 and 36a are press fit into apertures 100a and 102a. Having inserts 52 and 52a press fit into apertures 100a and 102a, respectively, results in inserts 36 and 36a being unable to rotate relative to inner link 16a. However, bushings 24 and 24a, track pins 28 and 28a, and collars 56 and 56a are able to rotate relative to link 16a in the directions indicated by arrows 216, 218, 220, and 222.

As shown in FIGS. 2, 3, and 11, adjacent subassemblies 20 are connected by a pair of outer links 18 and 18a. In particular, outer link 18 is positioned relative to cartridge assembly 22 of subassembly 20 so that (i) collar 56 is positioned within aperture 124 of outer link 18 and (ii) extension members 104, 106, and 108 are inwardly facing in the direction indicated by arrow 228 (see FIG. 2). In addition, outer link 18 is positioned relative to inner link 16 so that a gap of about 1.5 mm is defined between outer link 18 and inner link 16. It should be appreciated that this gap is present between all adjacent inner and outer links. Outer link 18 is also positioned relative to cartridge assembly 22a of an adjacent subassembly 20 so that collar 56a of cartridge assembly 22a is positioned within aperture 126 of outer link 18 (see FIG. 2). It should be appreciated that both collars 56 and 56a are press fit into apertures 124 and 126. Having collars 56 and 56a press fit into apertures 124 and 126, respectively, results in collars 56 and 56a and track pins 28 and 28a being unable to rotate relative to outer link 18. However, bushings 24 and 24a and inserts 52 and 52a are able to rotate relative to outer link 18.

Outer link 18a is positioned relative to cartridge assembly 22 of subassembly 20 so that (i) collar 40 is positioned within aperture 124a of outer link 18a and (ii) extension members 104a, 106a, and 108a are inwardly facing in the direction indicated by arrow 230 (see FIG. 2). Outer link 18a is also positioned relative to cartridge assembly 22a of the aforementioned adjacent subassembly 20 so that collar 40a of cartridge assembly 22a is positioned within aperture 126a of outer link 18a (see FIG. 2). It should be appreciated that both collars 40 and 40a are press fit into apertures 124a and 126a. Having collars 40 and 40a press fit into apertures 124a and 126a, respectively, results in collars 40 and 40a and track pins 28 and 28a being unable to rotate relative to outer link 18. However, bushings 24 and 24a and inserts 36 and 36a are able to rotate relative to outer link 18a.

Figure 17:
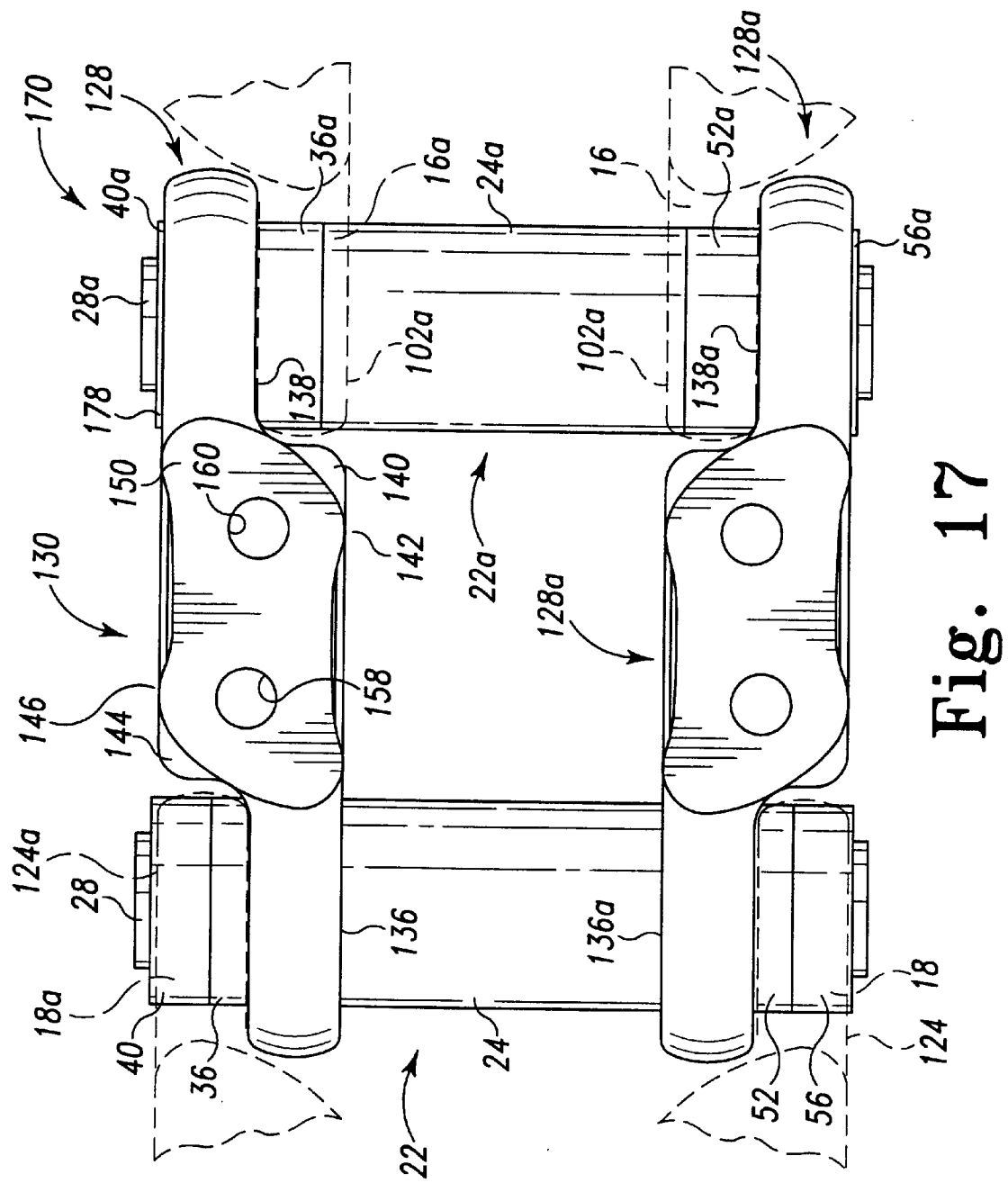
FIG. 17 is a top elevational view of another subassembly which can be used in the track chain assembly shown in FIG. 2.

Additional subassemblies 20 are coupled utilizing outer links 18 and 18a in the above described manner until a track chain assembly 14 having an appropriate length is obtained. Preferably, track chain assembly 14 is made up of an even number of links. When track chain assembly 14 is made up of an even number of links only links 16, 16a, 18, and 18a are required to construct track chain 14. However, certain situations require that track chain 14 be made up of an odd number of links. As shown in FIG. 17, when track chain assembly 14 is made up of an odd number of links track chain assembly 14 must include a single subassembly 170 which is constructed utilizing links 128 and 128a. It should be appreciated that link 128a is substantially identical to link 128 and therefore only link 128 will be described in detail herein.

Figure 13:
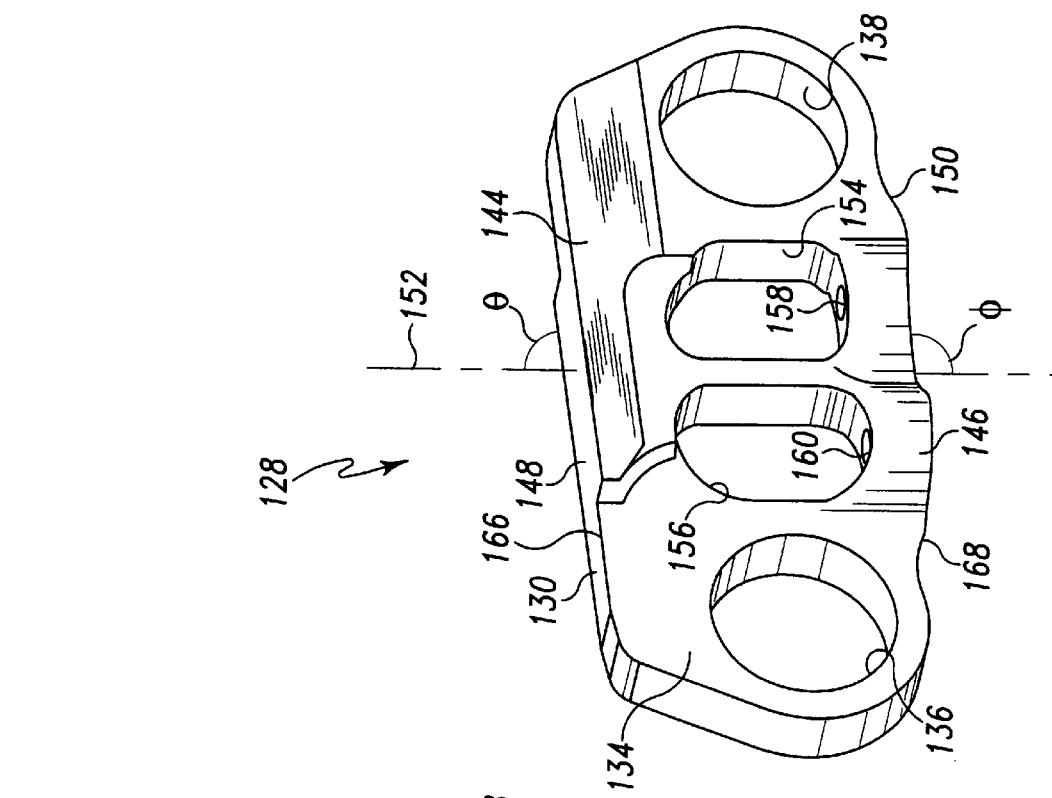
FIG. 13 is another perspective view of the off-set link shown in FIG. 12.
Figure 12:
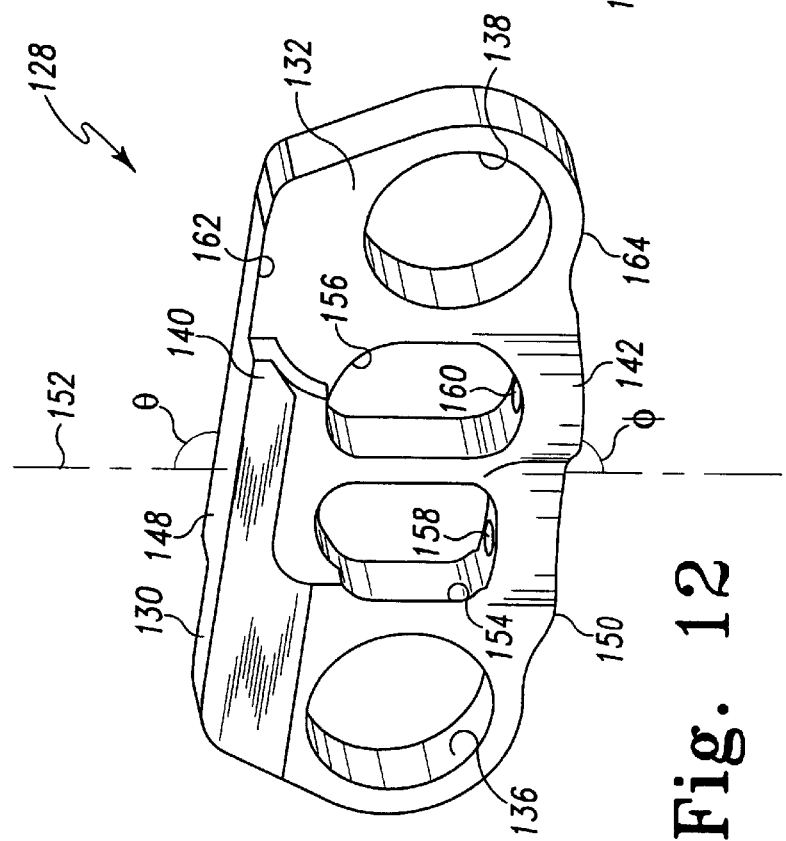
FIG. 12 is a perspective view of an off-set link which can be used in the track chain assembly shown in FIG. 2.
Figure 14:
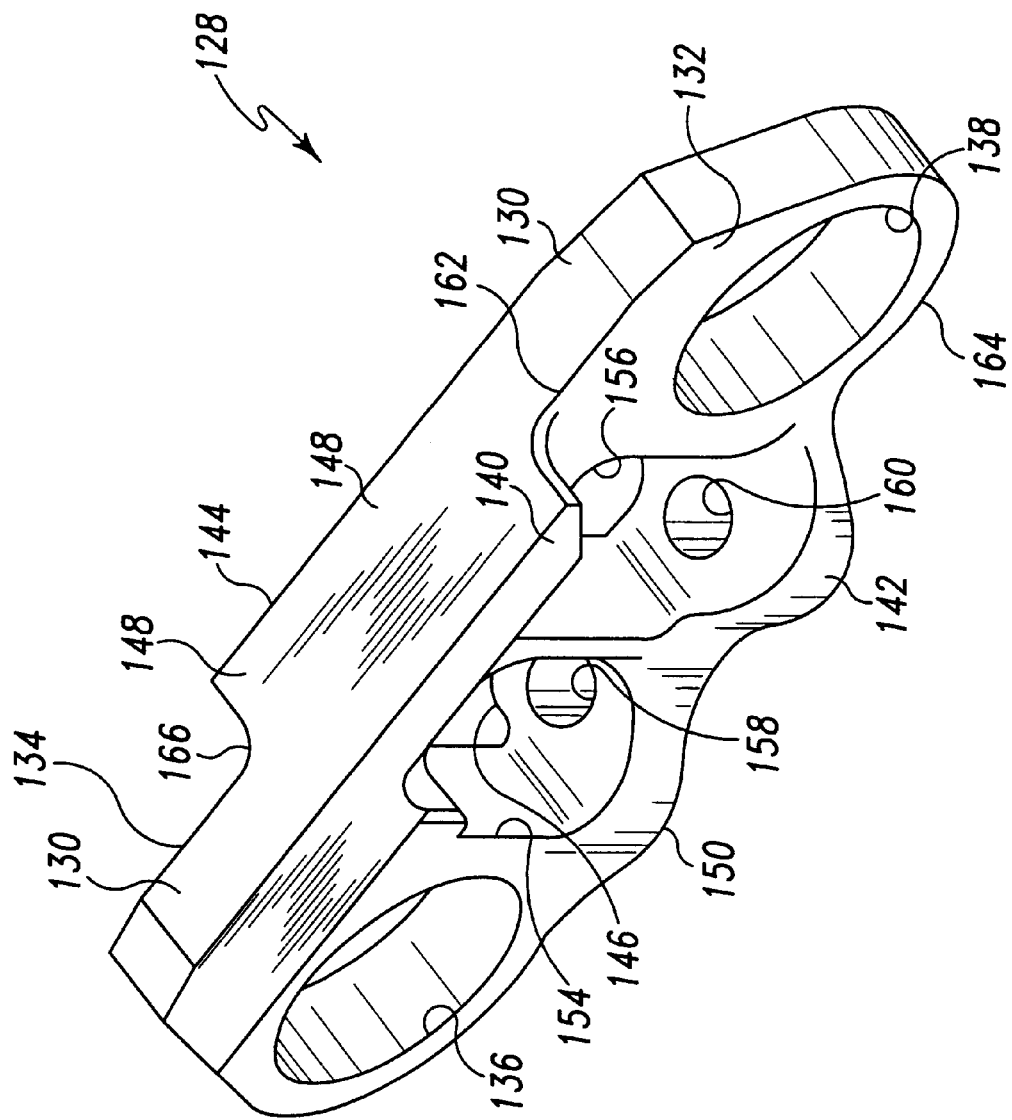
FIG. 14 is still another perspective view of the off-set link shown in FIG. 12.

As shown in FIG. 14, link 128 includes a body member 130 having (i) a side 132, (ii) a side 134, (iii) an aperture 136 defined therethrough, and (iv) an aperture 138 defined therethrough. Side 132 of body member 130 has an upper edge 162 and a lower edge 164. In addition, side 134 of body member 130 has an upper edge 166 and a lower edge 168 (see FIG. 13). Link 128 further includes an exit hole 154 and an exit hole 156 defined therein. However, it should be appreciated that only one exit hole can be utilized in, for example, a strutless link design. Exit holes 154 and 156 are interposed between aperture 136 and aperture 138. Link 128 also includes a bolt hole 158 and a bolt hole 160 defined in body member 130. Bolt holes 158 and 160 are positioned within exit hole 154 and exit hole 156, respectively. Link 128 also includes an extension member 140 extending outwardly from upper edge 162 of side 132 of body member 130. Link 128 also includes an extension member 142 extending outwardly from lower edge 164 of side 132 of body member 130. Extension member 142 is spaced apart from extension member 140. Link 128 also includes an extension member 144 extending outwardly from upper edge 166 of side 134 of body member 130. Link 128 further includes an extension member 146 extending outwardly from lower edge 168 of side 134 of body member 130. Extension member 142 is spaced apart from extension member 144. Body member 130 has a rail surface 148 and a shoe surface 150. A central axis 152 (see FIGS. 12 and 13) passes through rail surface 148 and shoe surface 150 so as to define a substantially 90° angle (i.e. angle θ) between (i) rail surface 148 and central axis 152 and (ii) a 90° angle (i.e. angle φ) between shoe surface 150 and central axis 152. Body member 130 is symmetrical about central axis 152. In particular, body member 130 is symmetrical but rotated relative to body member 94.

Side 132 is off-set from side 134 so that side 132 is not coplanar with side 134. Having sides 132 and 134 off-set gives clearance between adjacent links 128 when utilized in track chain 14. In addition, aperture 136 is off-set from aperture 138 so that aperture 136 is not coplanar with aperture 138. Extension member 142 and extension member 146 are interposed between aperture 136 and aperture 138.

Subassembly 170 includes a cartridge assembly 22, a cartridge assembly 22a, a link 128, and a link 128a as shown in FIG. 17. Note that cartridge assemblies 22 and 22a are identical to cartridge assemblies 22 and 22a discussed above in reference to FIG. 3. Link 128 is positioned relative to cartridge assemblies 22 and 22a such that (i) collar 40a of cartridge assembly 22a is located in aperture 138 and (ii) insert 36 is located in aperture 136. It should be appreciated that collar 40a and insert 36 are press fit into apertures 138 and 136, respectively. In a similar manner, link 128a is positioned relative to cartridge assemblies 22 and 22a such that (i) collar 56a of cartridge assembly 22a is located in aperture 138a and (ii) insert 52 is located in aperture 136a. It should be appreciated that collar 56a and insert 52 are press fit into apertures 138a and 136a, respectively.

Subassembly 170 is incorporated into track chain assembly 14 in the following manner. An inner link 16a is positioned relative to cartridge assembly 22a and the next adjacent cartridge assembly 22 (not shown in FIG. 17) such that (i) insert 36a of cartridge assembly 22a is press fit within aperture 102a and (ii) an insert 36 of the next adjacent cartridge assembly 22 is press fit into aperture 100a (not shown in FIG. 17). An inner link 16 is positioned relative to cartridge assembly 22a and the next adjacent cartridge assembly 22 such that (i) insert 52a of cartridge assembly 22a is press fit within aperture 102a and (ii) insert 36 of the next adjacent cartridge assembly 22 is press fit into aperture 100a (not shown in FIG. 17). An outer link 18a is positioned relative to cartridge 22 and the next adjacent cartridge assembly 22a (not shown in FIG. 17) such that (i) collar 40 of cartridge assembly 22 is press fit into aperture 124a and (ii) collar 40a of the next adjacent cartridge assembly 22a is press fit into aperture 126a (not shown in FIG. 17). An outer link 18 is positioned relative to cartridge 22 and the next adjacent cartridge assembly 22a (not shown in FIG. 17) such that (i) collar 56 of cartridge assembly 22 is press fit into aperture 124 and (ii) collar 56a of the next adjacent cartridge assembly 22a is press fit into aperture 126a (not shown in FIG. 17).

Industrial Applicability

Track chain assembly 14 has many advantages in addition to the advantages already discussed in reference to the links utilized therein. For example, cartridge assembly 22 enhances track chain assembly 14 life by improving the retention of the lubricant within cartridge assembly 22. (It should be understood that any advantage discussed in reference to cartridge assembly 22 also applies to cartridge assembly 22a.) Furthermore, since cartridge assembly 22 is a self-contained component and collars 40 and 56 are permanently attached to track pin 28 (e.g. by laser welding) cartridge assembly 22 provides a greater amount of control over axial end play as compared to track chain designs that utilize a link press fit directly onto a track pin. Moreover, since cartridge assembly 22 is self-contained and provides essentially all of the sealing and bearing functions required by track chain assembly 14, track chain assembly 14 can be easily serviced by removing old worn cartridge assemblies 22 and replacing them with new cartridge assemblies 22. Removing and replacing the entire cartridge assembly 22 to service track chain assembly 14 is more cost effective and efficient as compared to other track chain assembly designs which require servicing in a piece part manner.

The inserts utilized in cartridge assembly 22 also so have several advantages. (Note that the following advantages apply to all of the inserts utilized in cartridge assembly 22, however, only insert 36 will be discussed.) For example, the one piece structure of insert 36 allows track chain assembly 14 to be constructed without thrust washers and seal mounting shrouds which decreases the mechanical complexity and cost of track chain assembly 14. Furthermore, the structure of insert 36 provides for seal mounting of both seal members 72 and 74 in a single preassembled unit. In addition, the geometry of insert 36 allows for the relatively simple manufacturing of a straight bore 38. The straight bore of insert 36 facilitates the deflection or deformation of insert 36 upon being press fit into an aperture of a link (e.g. inner link 16). This deformation or deflection results in insert 36 providing a good bearing contact profile with track pin 28.

Other aspects, objects and advantages of this invention can be obtained from a study of the drawings, disclosures, and the appended claims.

What is claimed is:

1. A link for a track chain assembly of a track type work machine, comprising:
 - a body member having (i) a first side, (ii) a second side, (iii) a first aperture defined therethrough, and (iv) a second aperture defined therethrough;
 - a first extension member extending outwardly from said first side of said body member;
 - a second extension member extending outwardly from said first side of said body member, said second extension member being spaced apart from said first extension member;
 - a third extension member extending outwardly from said second side of said body member; and
 - a fourth extension member extending outwardly from said second side of said body member, said fourth extension member being spaced apart from said third extension member;
  - wherein said body member has a rail surface and a shoe surface,
 - a central axis passes through rail surface and said shoe surface so as to define a substantially 90° angle between (i) said rail surface and said central axis and (ii) said shoe surface and said central axis, and
 said body member is symmetrical about said central axis.

2. The link of claim 1, wherein:
said first aperture is off-set from said second aperture so that said first aperture is not coplanar with said second aperture.

3. The link of claim 1, wherein:
said second extension member and said fourth extension member are interposed between said first aperture and said second aperture.

4. The link of claim 1, wherein:
said body member has a first exit hole defined therein,
said body member has a second exit hole defined therein, and
said first exit hole and said second exit hole are interposed between said first aperture and said second aperture.

5. The link of claim 4, further comprising:
a first bolt hole defined in said body member; and
a second bolt hole defined in said body member,
 wherein (i) said first bolt hole is positioned within said first exit hole and (ii) said second bolt hole is positioned within said second exit hole.

6. The link of claim 1, wherein:
said first side of said body member has an upper edge and a lower edge,
said first extension member extends from said upper edge, and
said second extension member extends from said lower edge.

7. The link of claim 6, wherein:
said second side of said body member has an upper edge and a lower edge,
said third extension member extends from said upper edge of said second side, and
said fourth extension member extends from said lower edge of said second side.

8. A subassembly for a track chain of a track type work machine, comprising:
 - a first bushing having a first passageway defined therethrough;
 - a first track pin positioned within said first passageway;
 - a first insert having a first bore defined therein, said first insert being positioned relative to said first track pin such that said first track pin is located within said first bore;
 - a second bushing having a second passageway defined therethrough;
 - a second track pin positioned within said second passageway;
 - a second insert having a second bore defined therein, said second insert being positioned relative to said second track pin such that said second track pin is located within said second bore;
 - a first collar having a first hole defined therein, said first collar being positioned relative to said first track pin such that (i) said first track pin is located within said first hole so that said first track pin is unable to rotate relative to said first collar and (ii) said first insert is interposed between said first collar and said first bushing;
 - a second collar having a second hole defined therein, said second collar being positioned relative to said second track pin such that (i) said second track pin is located within said second hole so that said second track pin is unable to rotate relative to said second collar and (ii) said second insert is interposed between said second collar and said second bushing; and
 - a link having (a) a body member which has (i) a first side, (ii) a second side, (iii) a first aperture defined therethrough, and (iv) a second aperture defined therethrough, (b) a first extension member extending outwardly from said first side of said body member, (c) a second extension member extending outwardly from said first side of said body member, said second extension member being spaced apart from said first extension member, (d) a third extension member extending outwardly from said second side of said body member, and (e) a fourth extension member extending outwardly from said second side of said body member, said fourth extension member being spaced apart from said third extension member, wherein said body member has a rail surface and a shoe surface, a central axis passes through rail surface and said shoe surface so as to define a substantially 90° angle between (i) said rail surface and said central axis and (ii) said shoe surface and said central axis, said body member is symmetrical about said central axis, and said link is positioned relative to said first insert and said second collar such that (i) said first insert is located within said first aperture and (ii) said second collar is located within said second aperture.

9. The subassembly of claim 8, wherein:

said second extension member and said fourth extension member are interposed between said first aperture and said second aperture.

10. The subassembly of claim 8, wherein:

said body member has a first exit hole defined therein, said body member has a second exit hole defined therein, and said first exit hole and said second exit hole are interposed between said first aperture and said second aperture.

11. The subassembly of claim 10, further comprising:

a first bolt hole defined in said body member; and a second bolt hole defined in said body member, wherein (i) said first bolt hole is positioned within said first exit hole and (ii) said second bolt hole is positioned within said second exit hole.

12. The subassembly of claim 8, wherein:

said first side of said body member has an upper edge and a lower edge, said first extension member extends from said upper edge, and said second extension member extends from said lower edge.

13. The subassembly of claim 12, wherein:

said second side of said body member has an upper edge and a lower edge, said third extension member extends from said upper edge of said second side, and said fourth extension member extends from said lower edge of said second side.

14. A link for a track chain assembly of a track type work machine, comprising:

a body member having (i) a first side, (ii) a second side, (iii) a first aperture defined therethrough, and (iv) a second aperture defined therethrough;

a first extension member extending outwardly from said first side of said body member;

a second extension member extending outwardly from said first side of said body member, said second extension member being spaced apart from said first extension member;

a third extension member extending outwardly from said second side of said body member; and a fourth extension member extending outwardly from said second side of said body member, said fourth extension member being spaced apart from said third extension member;

wherein said body member has a rail surface and a shoe surface, a central axis passes through said rail surface and said shoe surface so as to define a substantially 90° angle between (i) said rail surface and said central axis and (ii) said shoe surface and said central axis, said body member is symmetrical about said central axis, said first aperture is off-set from said second aperture so that said first aperture is not coplanar with said second aperture, and said second extension member and said fourth extension member are interposed between said first aperture and said second aperture.

15. The link of claim 14, wherein:

said body member has a first exit hole defined therein, said body member has a second exit hole defined therein, and said first exit hole and said second exit hole are interposed between said first aperture and said second aperture.

16. The link of claim 15, further comprising:

a first bolt hole defined in said body member; and a second bolt hole defined in said body member, wherein (i) said first bolt hole is positioned within said first exit hole and (ii) said second bolt hole is positioned within said second exit hole.

17. The link of claim 14, wherein:

said first side of said body member has an upper edge and a lower edge, said first extension member extends from said upper edge, and said second extension member extends from said lower edge.

18. The link of claim 17, wherein:

said second side of said body member has an upper edge and a lower edge, said third extension member extends from said upper edge of said second side, and said fourth extension member extends from said lower edge of said second side.

* * * * *